(12) United States Patent
Chestna

(10) Patent No.: US 9,195,833 B2
(45) Date of Patent: Nov. 24, 2015

(54) SYSTEM AND METHOD FOR IMPLEMENTING APPLICATION POLICIES AMONG DEVELOPMENT ENVIRONMENTS

(71) Applicant: Veracode, Inc., Burlington, MA (US)

(72) Inventor: Peter John Chestna, Auburn, MA (US)

(73) Assignee: Veracode, Inc., Burlington, MA (US)

( * ) Notice: Subject to any disclaimer, the term of this patent is extended or adjusted under 35 U.S.C. 154(b) by 107 days.

(21) Appl. No.: 14/083,750

(22) Filed: Nov. 19, 2013

(65) Prior Publication Data
US 2015/0143524 A1    May 21, 2015

(51) Int. Cl.
*H04L 29/06* (2006.01)
*G06F 21/57* (2013.01)
*G06F 11/36* (2006.01)
*G06F 21/53* (2013.01)

(52) U.S. Cl.
CPC .............. *G06F 21/577* (2013.01); *G06F 11/36* (2013.01); *G06F 21/53* (2013.01); *G06F 2221/033* (2013.01)

(58) Field of Classification Search
CPC ....... G06F 21/577; G06F 21/53; G06F 11/36; G06F 2221/033
USPC .............................. 726/25, 26, 23, 30, 4, 1, 5
See application file for complete search history.

(56) References Cited

U.S. PATENT DOCUMENTS

| 6,442,620 | B1 * | 8/2002 | Thatte et al. ................... 719/316 |
| 6,615,350 | B1 * | 9/2003 | Schell et al. ................... 713/168 |
| 6,748,555 | B1 * | 6/2004 | Teegan et al. ............... 714/38.12 |
| 2005/0005261 | A1 * | 1/2005 | Severin .......................... 717/108 |
| 2006/0143144 | A1 * | 6/2006 | Speeter et al. .................. 706/47 |
| 2009/0099860 | A1 * | 4/2009 | Karabulut et al. ................. 705/1 |
| 2009/0259993 | A1 * | 10/2009 | Konduri et al. ............... 717/127 |
| 2009/0300585 | A1 * | 12/2009 | Meenakshisundaram et al. ............................. 717/124 |
| 2010/0005451 | A1 * | 1/2010 | Hirose et al. .................. 717/121 |

(Continued)

FOREIGN PATENT DOCUMENTS

| EP | 2575069 A2 | 4/2013 |
| GB | 2495377 A | 4/2013 |

OTHER PUBLICATIONS

International Search Report and Written Opinion for International Patent Application No. PCT/US2014/066400 mailed Mar. 4, 2015 (10 pages).

*Primary Examiner* — David Garcia Cervetti
(74) *Attorney, Agent, or Firm* — Goodwin Procter LLP

(57) ABSTRACT

In a system for facilitating distributed security and vulnerability testing of a software application, each development sandbox in a set of sandboxes receives a portion of the entire application, and the received portion may be tested based on an application-level security policy to obtain a pass/fail result. The portion of the application corresponding to a certain sandbox may be modified and rescanned (i.e., retested) until the modifications, i.e., development achieves functional and quality requirements, and a pass result is obtained. Thereafter, the scan results are promoted to a policy sandbox, where a compliance result for the entire software application can be obtained based on, at least in part, the promoted results. Other sandboxes may also perform their respective pass/fail testing using the promoted results, thus minimizing the need for synchronizing the code changes in different sandboxes before testing for security policy in any sandbox and/or during application-level scanning.

20 Claims, 1 Drawing Sheet

(56) References Cited

U.S. PATENT DOCUMENTS

| | | | |
|---|---|---|---|
| 2010/0154066 A1* | 6/2010 | Hammes et al. | 726/30 |
| 2011/0173693 A1* | 7/2011 | Wysopal et al. | 726/19 |
| 2011/0231936 A1* | 9/2011 | Williams et al. | 726/25 |
| 2011/0296529 A1* | 12/2011 | Bhanoo et al. | 726/26 |
| 2012/0167157 A1* | 6/2012 | Walsh et al. | 726/1 |
| 2013/0326477 A1* | 12/2013 | Wyatt et al. | 717/120 |

\* cited by examiner

SYSTEM AND METHOD FOR IMPLEMENTING APPLICATION POLICIES AMONG DEVELOPMENT ENVIRONMENTS

FIELD OF THE INVENTION

The present invention generally relates to detection and mitigation or elimination of vulnerabilities in software applications, and more particularly to systems and methods for performing these operations directly on a compiled binary of a software application.

BACKGROUND OF THE INVENTION

Software applications are typically developed by teams of programmers, each being responsible for individual components or functionality. To facilitate rapid application development, the developers usually program in parallel, often on components that may be integrated with other elements of the application. To support such activities, conventional development environments usually include a central code repository and separate, individual development environments for each programmer, often referred to as "branches." Developers "check out" code from the central repository, work on the code in an environment that is secluded from others as not to introduce programming errors into the primary codebase, and once properly tested, check their code back in. A release engineer or QA engineer then confirms the new code, compiles a new application instance, and allows others to access the newly developed code for subsequent development or release.

Separately, applications are often tested against enterprise policies that govern compliance with security and vulnerability criteria. However, use of the application or enterprise-level policies often results in rework and repetition of effort, as the policies are not checked until the overall application is compiled. Ways to support multiple separate streams of development of an application while ensuring that policy compliance and analytics at the enterprise level are not adversely affected, are not generally available. Improved techniques for parallel application development in several branches are therefore needed.

SUMMARY OF THE INVENTION

Various embodiments of the present invention feature a platform and a methodology that facilitates efficient compliance checking as developers work in separate development environments (also called sandboxes or branches). This is achieved, at least in part, by providing methods and supporting systems for sharing centralized security and vulnerability policy and compliance data among developers working in segregated development environments. In particular, programmers can share metadata, flaw matching/mitigation information, and policy definition across multiple independent scans and code streams. This allows several developers to scan the application or a portion thereof in a segregated environment under the umbrella of a single application, but without colliding with or having to synchronize with parallel/overlapping application development by others. The developers can receive, however, any updated test results regarding application vulnerabilities, and can analyze policy compliance of their respective branches in light of such updated results. Thus, this overall environment can avoid or at least reduce some of the burden (e.g., synchronization of one or more branches), while accounting for any impact on the entire application such development may have. Security vulnerabilities can thus be found early in the development cycle, thereby reducing the overall cost of remediation and preventing the errors from being merged back into the main code base. It also allows engineering management and the security team to monitor the development staff for secure coding practices to identify training opportunities.

Accordingly, in one aspect, a method for facilitating distributed security and vulnerability testing of a software application includes establishing application-level security policy parameters. The method also includes distributing the application-level policy parameters to a policy sandbox, and distributing portions of the application to a number of development sandboxes. Each sandbox may be configured to permit further development of the portion of the application distributed thereto. Often, the objective of such development is to reduce the number of known vulnerabilities and/or to provide additional functionality. The method further includes testing, in one or more sandboxes, the corresponding portion of the application pursuant to the application-level security policy parameters via access to the policy sandbox, and updating the policy sandbox with test results from at least one of the several development sandboxes.

These updated results can be used in the respective testing in one or more of the other sandboxes. Similarly, the sandbox being tested can also use updated (also called promoted) test results from the other sandboxes, without having to synchronize with the other sandboxes, i.e., without having to incorporate any changes made to the application in various other sandboxes into the sandbox being tested. Advantageously, this can substantially decrease the development and/or testing effort and time, because both sandbox/branch integration and testing the entire application can be time consuming.

In some embodiments, the method further includes designating a scan ID to application test results. A compliance result based on, at least in part, the application test results may be computed, and the scan ID may be associated with the compliance result. The test results, the compliance result, or both may be stored in the policy sandbox, e.g., for use by other sandboxes. The application test results may be obtained by, at least in part, testing the entire software application using the application-level security policy parameters. Alternatively or in addition, the application test results may include sandbox test results that were promoted from one or more development sandboxes.

In some embodiments, each of the several development sandboxes corresponds to a scan ID. One of the sandboxes is designated as a first sandbox, and the first sandbox corresponds to a first designated portion of the application. In these embodiments, testing the first portion of the application includes: (a) obtaining first sandbox test results by testing, in a first iteration, the first portion of the application. Other portions of the application may also be tested. Testing also includes (b) computing a first difference between the first sandbox test results and application test results associated with the scan ID. Thereafter, a first evaluation may be obtained in step (c) by evaluating policy flaw restrictions based on, at least in part, the first difference.

In step (d), if the first evaluation fails, the first portion of the application may be modified and retested in a second iteration, to obtain second sandbox test results for the first sandbox. A second difference between the second sandbox test results and the application test results associated with the scan ID and/or the first sandbox test results is computed, and a second evaluation may be obtained by evaluating policy flaw restrictions based on, at least in part, the second difference. In these embodiments, updating the policy sandbox includes (e) promoting, to the policy sandbox, promoted test results that include the first sandbox test results if the first evaluation succeeds, or the second sandbox test results if the second evaluation succeeds.

In various embodiments, a second sandbox is included within the several development sandboxes, and the second sandbox corresponds to a second designated portion of the application. Testing the corresponding portion (i.e., the second portion) of the application further includes performing steps (a) through (d) with respect to the second sandbox. In addition, updating the policy sandbox further includes performing step (e) with respect to the second sandbox. The testing the first and second portions of the application in the first and second sandboxes, respectively, may at least partially overlap in time.

The application-level security policy parameters may include scan frequency parameters, flaw restriction parameters, or both. The scan frequency parameters may include one or more of: (i) a type of analysis, the type of analysis comprising at least one of static, dynamic, manual, and behavioral analysis, and (ii) a frequency of analysis, the frequency comprising at least one of once, monthly, quarterly, and yearly. The flaw restrictions may include one or more of individual common weakness enumeration (CWE), flaw category, flaw severity, and a standardized restriction based on, at least in part, at least one of Open Web Application Security Project (OWASP), SysAdmin, Audit, Networking, and Security (SANS), Computer Emergency Readiness Team (CERT), and Payment card industry (PCI) standards.

In another aspect, a system for facilitating distributed security and vulnerability testing of a software application includes a memory that includes at least a portion of application-level security policy parameters, and a first processor coupled to the memory. The first processor is configured to provide a first development sandbox that is adapted to receive a first portion of the entire application. The first sandbox is also adapted to compute and/or receive application test results. The first development sandbox can permit further development of the first portion of the application received therein. Additionally, the first processor is configured to test the first portion of the application pursuant to at least a portion of the application-level security policy parameters, so as to obtain first sandbox test results, and to update a policy sandbox with the first sandbox test results.

In some embodiments, in order to test the first portion of the application, the first processor is configured: (a) to obtain initial sandbox test results by testing in a first iteration the first portion of the application, (b) to compute an initial difference between the initial sandbox test results and the application test results, and (c) to obtain an initial evaluation by evaluating policy flaw restrictions based on, at least in part, the initial difference. The first processor is further configured to: (d) if the evaluation fails, (A) obtain revised sandbox test results by testing in a second iteration the first portion of the application, and (B) to compute a revised difference between the revised sandbox test results and one or more of the application test results, the initial sandbox test results, and any previously revised sandbox test results. Prior to retesting in the second iteration, the first portion of the application may be modified, for example, to remedy certain known security vulnerabilities. The first processor is also configured (C) to obtain a revised evaluation by evaluating policy flaw restrictions based on, at least in part, the revised difference. Moreover, to update the policy sandbox, the first processor is further configured to: (e) designate as first sandbox test results the initial sandbox test results if the initial evaluation succeeds, or the revised sandbox test results if the revised evaluation succeeds, and (f) to promote, to the policy sandbox, the first sandbox test results.

In some embodiments, the system additionally includes a second processor coupled to the memory. The second processor is configured to provide a second development sandbox adapted to receive a second portion of the entire application. The second sandbox, which can permit further development of the second portion of the application received therein, is also adapted to compute and/or receive the application test results. The second processor is further configured to test the second portion of the application pursuant to at least a portion of the application-level security policy parameters, so as to obtain second sandbox test results. In addition, the second processor is adapted to update the policy sandbox with the second sandbox test results.

In some embodiments, the first and second processors are different, while in other embodiments, a single processor represents both the first and second processors. The first development sandbox is typically different than the second development sandbox. The application test results may include initial application test results, updated application test results in the policy sandbox, or both. The updated application test results in the policy sandbox may be promoted therein from one or more of the sandboxes, e.g., the first development sandbox, a second development sandbox, etc.

In some embodiments, the system further includes a server configured to provide the policy sandbox and to compute the initial application test results based on, at least in part, testing of the entire software application. The first processor may be adapted to receive the application test results. The server may be configured to designate the updated application test results as the initial application test results. The server may be further configured to designate a scan ID to the initial application test results, and to compute and associate with the scan ID, a compliance result based on, at least in part, the initial application test results. Moreover, the server may be configured to store the compliance result associated with the scan ID in the policy sandbox.

In some embodiments, the server is configured to designate a scan ID to the initial application test results, and to compute and associate with the scan ID, a compliance result based on, at least in part, the updated application test results. The server may be further configured to store the compliance result associated with the scan ID in the policy sandbox. A single processor may be configured as both the first processor and the server.

In another aspect, an article of manufacture, including a non-transitory machine-readable medium storing instructions that, when executed by a machine comprising a memory and a processor in electronic communication with the memory, configure the memory to store at least a portion of application-level security policy parameters. In addition, for facilitating distributed security and vulnerability testing of a software application, the instructions configure the processor to provide a first development sandbox that is adapted to receive a first portion of the entire application. The first sandbox is also adapted to compute and/or receive application test results. The first development sandbox can permit further development of the first portion of the application received therein. According to the instructions, the first processor is further configured to test the first portion of the application pursuant to at least a portion of the application-level security policy parameters, so as to obtain first sandbox test results, and to update a policy sandbox with the first sandbox test results.

In some embodiments, in order to test the first portion of the application, the instructions configure the first processor: (a) to obtain initial sandbox test results by testing in a first iteration the first portion of the application, (b) to compute an initial difference between the initial sandbox test results and the application test results, and (c) to obtain an initial evaluation by evaluating policy flaw restrictions based on, at least in part, the initial difference. The instructions further configure the first processor to: (d) if the evaluation fails, (A) obtain revised sandbox test results by testing in a second iteration the first portion of the application, and (B) to compute a revised difference between the revised sandbox test results and one or more of the application test results, the initial sandbox test results, and any previously revised sandbox test results. Prior to retesting in the second iteration, the first portion of the application may be modified, for example, to remedy certain known security vulnerabilities. The instructions may also configure the first processor (C) to obtain a revised evaluation by evaluating policy flaw restrictions based on, at least in part, the revised difference. Moreover, to update the policy sandbox, the instructions further configure the first processor to: (e) designate as first sandbox test results the initial sandbox test results if the initial evaluation succeeds, or the revised sandbox test results if the revised evaluation succeeds, and (f) to promote, to the policy sandbox, the first sandbox test results.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
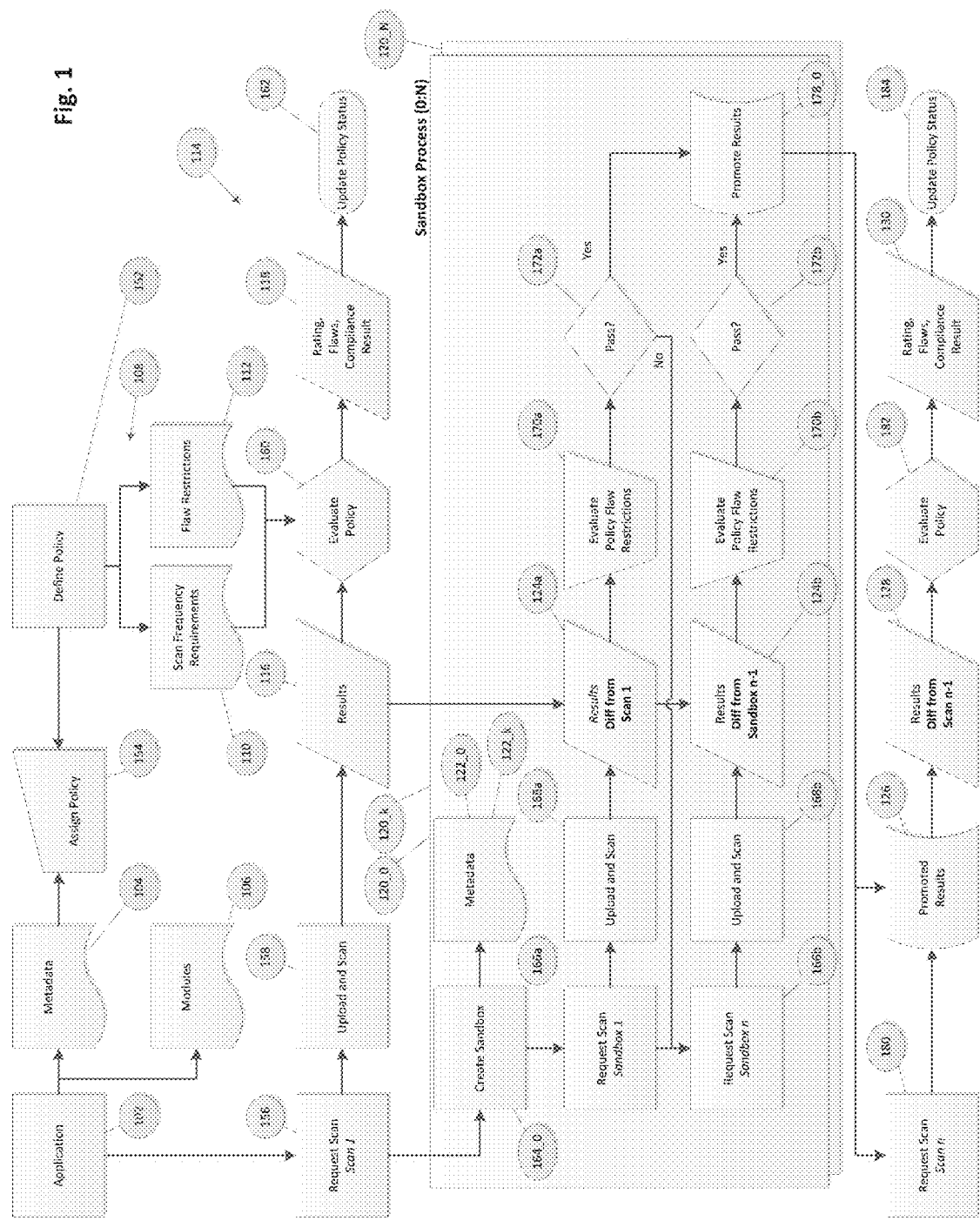
FIG. 1 schematically depicts a policy sandbox system and the operating environment thereof, according to one embodiment.

With reference to FIG. 1, the metadata 104 and modules 106 corresponding to a software application 102 are generated, for example, by the development team or build engineer. A security/vulnerability compliance policy 108 is typically determined at step 152 by a combination of best practices and regulatory compliance requirements along with the business criticality of the application. The compliance policy may include parameters such as scan frequency requirements 110, flaw restrictions 112, etc. In general, scan frequency dictates the type of analysis to be completed (static, dynamic, manual, behavioral, etc) and how often that analysis must be done (once, monthly, quarterly, yearly, etc). Flaw restrictions can be configured by such items as individual Common Weakness Enumeration (CWE), by flaw category, flaw severity or by common standards such as OWASP, SANS, CERT and PCI. Once the policy is determined, it may be assigned at step 154 to the software application 102 so that it can be ensured that subsequent modifications of the software application are compliant with the security/vulnerability policy 108.

To this end, in various embodiments, the policy is made available to a policy sandbox 114. In steps 156, 158, the entire enterprise-level software application 102 may be scanned i.e., tested, in an enterprise/application-level scan (e.g., scan A1). The application-level test results 116 (e.g., AT1) of the scan may be uploaded to the policy sandbox 114. During further development of the software application, compliance with the policy may be evaluated against these results and a compliance result is obtained. In general, the scan results include the flaws detected during testing, including any new flaws that were found, previously discovered flaws that are still open or re-opened, i.e., designated as uncured, and previously found flaws that are no longer found, e.g., determined to be fixed. With respect to the policy sandbox 114, the entire policy is evaluated at step 160, i.e., flaws are detected and analyzed, whether the scans required by the policy are performed at the specified frequency is determined, and/or after a grace period allowed for flaw remediation. Based on this evaluation, a policy compliance status or an application compliance value 118, e.g., Compliant, Not Compliant, or Conditionally Compliant, is determined and the policy status is updated at step 162. Conditional compliance typically takes into account a grace period for curing new flaws, as well as required scans that are not yet performed. Generally, the sandbox scans only evaluate the flaw based rules.

After the application-level scan A1, if the application is to be modified and/or tested under different conditions, a sandbox $120\_0$ is created at step $164\_0$. Additional sandboxes up to sandbox $120\_N$ may also be created. Typically only a portion of the application program/code is assigned to each sandbox, though the entire application program may be assigned to one or more sandboxes. The portions assigned to two sandboxes can be identical, partially overlapping, or distinct. Each sandbox $120\_k$ may include the metadata $122\_k$ associated with the entire application or with the specific portion assigned to the sandbox. For example, metadata $122\_0$ is associated with the sandbox $120\_0$. Typically, different developers/programmers may independently modify and/or test the portion of the program assigned to each sandbox, respectively.

In one embodiment, after modifying a portion assigned to a particular sandbox $120\_0$ (e.g., sandbox A1S1), the developer may scan/test the sandbox in a first iteration (e.g., A1S1_1) at steps 166a and 168a. The scan request typically creates a structure for starting the scanning process, holding scan results, and evaluating the policy. In some embodiments, each scan request holds the meta-data about that scan (e.g., date on which the scan was requested, user requesting the scan, type of scan requested, etc.), the files that were uploaded and selected for scanning, the scan configuration, if any, any results from that scan, and the policy evaluation of those results.

Under this scan/test, one portion of the program may be unchanged from the previous enterprise-level scanning A1, but another portion of the program may have been modified. The results (e.g., A1S1T1) of this testing iteration are compared with the results of the application-level test AT1, and a difference therebetween 124a (e.g., A1S1D1) is computed. The difference may include of a set of new vulnerabilities, re-opened or regressed vulnerabilities, vulnerabilities that are still present from the previous scan (i.e., open vulnerabilities), and vulnerabilities from a previous scan that are no longer found (i.e., fixed vulnerabilities). The security/vulnerability compliance policy is then reevaluated at step 170a using the test results A1S1T1 and/or the computed difference A1S1D1, as described above. In some embodiments, the reevaluation based on the difference between the results can be faster than reevaluating the policy using the full scan results.

In various embodiments, the policy reevaluation can provide a pass/fail result at step 172a based on the flaws found during the scan. If the previously detected flaws are remediated and no new prohibited flaws are introduced, an iteration may be designated as pass or success. In some embodiments, not all previously detected flaws may be remediated and/or some new vulnerabilities may be introduced. The iteration may nevertheless be designated as pass if there is no increase or decrease in the total number of uncured/un-remediated flaws that violate the flaw restrictions. In the foregoing example, the scan in the first iteration may be designated as failed at the step 172a.

If the first iteration A1S1_1 of scanning the sandbox A1S1 fails, the developer may further modify the portion of the program/code assigned to the sandbox 120_0 (i.e., A1S1), and may test the sandbox again in a second iteration 166b and 166b (e.g., A1S1_2), producing results A1S1T2. The comparison, computation of difference 124b, and reevaluation at 170b, as described above, are repeated, and another pass/fail result is obtained at step 172b. Such iterations for sandbox A1S1 may continue until the development effort achieves functional and quality requirements and a pass result is achieved. If the result of i-th iteration (i=1, 2, 3, ..., etc.) is pass, the corresponding results A1S1T1 for sandbox A1S1 may be promoted to the policy sandbox, e.g., after the second iteration at step 178_0. Upon promotion, other sandboxes may utilize these results in their respective evaluations.

As described above, typically, different developers/programmers independently modify and/or test the portion of the program assigned to each sandbox. As such, in one embodiment, a second sandbox (e.g., sandbox A1S2) is created after the application-level scan A1. Sandbox A1S2 is scanned similarly as sandbox A1S1, in one or more iterations. In a first iteration, the scanning of this sandbox may produce test results A1S2T1 and a difference A1S2D1, as described above. If this iteration fails, a second iteration may produce test results A1S2T2 and a difference A1S2D2. Similarly as with respect to sandbox A1S1, if the result of j-th iteration (j=1, 2, 3, ..., etc.) is pass, the corresponding results A1S2Tj for sandbox A1S2 may be promoted to the policy sandbox, and may be shared with other sandboxes. The iterations and/or promotion from sandbox A1S2 may be performed substantially in parallel with the iterations and/or promotion from sandbox A1S1, or these operations may only partially overlap in time. In some embodiments, however, these operations are performed sequentially. It should be understood that the discussion of two iterations and two sandboxes is illustrative only, and that various embodiments may include one or more (e.g., 5, 10, 12, etc.) sandboxes and/or iterations. Typically, though not necessarily, the number of sandboxes (e.g., N) is different than the number of iterations for a sandbox (e.g., n). The number of maximum and/or actually performed iterations in different sandboxes may be the same or may be different.

After scanning various sandboxes as described above, a second enterprise/application-level scan (e.g., scan A2) may be performed at step 180. In the scan A2, the results promoted from each of the sandboxes 120_0 through 120_N may be used so as to obtain a new or updated set of application-level test results 126 (e.g., AT2). The application-level test results AT1 and AT2 can be compared to compute a difference 128 therebetween. Based on this difference, the policy can be reevaluated at step 182 to obtain updated compliance results 130, and the policy status may be updated based on those compliance results at step 184. A new set of sandboxes, e.g., A2S1, A2S2, etc., may be created thereafter, and those sandboxes may be scanned as described above. In some embodiments new sandboxes are not created after the scan A2, and instead, the sandboxes created previously after the scan A1, e.g., A1S1, A1S2, are reused in performing new scans/tests, generating new sandbox test results, and performing new evaluations, in a manner similar to that described above.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/ processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

I claim:

1. A method for facilitating distributed security and vulnerability testing of a software application, the method comprising:
    establishing application-level security policy parameters;
    distributing the application-level policy parameters to a policy sandbox;
    distributing portions of the application to a plurality of development sandboxes, each development sandbox configured to permit further development of the portion of the application distributed thereto, wherein the plurality of development sandboxes: (i) corresponds to a scan ID; and (ii) comprises a first development sandbox, the first development sandbox corresponding to a first designated portion of the application;
    testing in at least one development sandbox the corresponding portion of the application, pursuant to the application-level security policy parameters via access to the policy sandbox, wherein testing the first portion of the application comprises:
        (a) obtaining first development sandbox test results by testing in a first iteration at least the first portion of the application;
        (b) computing a first difference between the first development sandbox test results and application test results associated with the scan ID;
        (c) obtaining a first evaluation by evaluating policy flaw restrictions based on, at least in part, the first difference;
        (d) if the evaluation fails:
            (A) obtaining second development sandbox test results by testing in a second iteration the portion designated to the first development sandbox;
            (B) computing a second difference between the second development sandbox test results and at least one of the application test results associated with the scan ID and the first development sandbox test results; and
            (C) obtaining a second evaluation by evaluating policy flaw restrictions based on, at least in part, the second difference; and
    updating the policy sandbox with test results from at least one of the plurality of development sandboxes, wherein updating comprises:
        promoting, to the policy sandbox, promoted test results comprising the first development sandbox test results if the first evaluation succeeds, or the second development sandbox test results if the second evaluation succeeds.

2. The method of claim 1, further comprising:
    designating a scan ID to application test results;
    computing and associating with the scan ID a compliance result based on, at least in part, the application test results; and
    storing at least one of: (i) the application test results associated with the scan ID, and (ii) the compliance result associated with the scan ID, in the policy sandbox.

3. The method of claim 2, further comprising testing the entire software application using the application-level security policy parameters to obtain the application test results.

4. The method of claim 2, wherein the application test results comprise development sandbox test results promoted from at least one development sandbox within the plurality of development sandboxes.

5. The method of claim 1, wherein
    the plurality of development sandboxes comprises a second development sandbox, the second development sandbox corresponding to a second designated portion of the application;
    testing the corresponding portion of the application comprises performing steps (a) through (d) with respect to the second development sandbox; and
    updating further comprises performing step (e) with respect to the second development sandbox.

6. The method of claim 5, wherein testing the first portion of the application in the first development sandbox and testing the second portion of the application in the second development sandbox at least partially overlap in time.

7. The method of claim 1 wherein the application-level security policy parameters comprise at least one of scan frequency parameters and flaw restriction parameters.

8. The method of claim 7, wherein the scan frequency parameters comprise at least one of: (i) a type of analysis, the type of analysis comprising at least one of static, dynamic, manual, and behavioral analysis, and (ii) a frequency of analysis, the frequency comprising at least one of once, monthly, quarterly, and yearly.

9. The method of claim 7, wherein the flaw restrictions comprise at least one of individual common weakness enumeration (CWE), flaw category, flaw severity, and a standardized restriction based on, at least in part, at least one of OWASP, SANS, CERT, and PCI standards.

10. A system for facilitating distributed security and vulnerability testing of a software application, the system comprising:
a memory comprising at least a portion of application-level security policy parameters;
a first processor coupled to the memory and configured to:
provide a first development sandbox adapted to: (i) receive a first portion of the entire application, and (ii) at least one of compute and receive application test results, the first development sandbox permitting further development of the first portion of the application received therein;
test the first portion of the application pursuant to at least a portion of the application-level security policy parameters, to obtain first development sandbox test results; and
update a policy sandbox with the first development sandbox test results; and
a second processor coupled to the memory and configured to:
provide a second development sandbox adapted to: (i) receive a second portion of the entire application, and (ii) at least one of compute and receive the application test results, the second development sandbox permitting further development of the second portion of the application received therein;
test the second portion of the application pursuant to at least a portion of the application-level security policy parameters, to obtain second development sandbox test results; and
update the policy sandbox with the second development sandbox test results.

11. The system of claim 10, wherein the first and second processors are different.

12. The system of claim 10, wherein a single processor comprises the first processor and the second processor, and the first development sandbox is different than the second development sandbox.

13. The system of claim 10, wherein the application test results comprise at least one of: (i) initial application test results, and (ii) updated application test results in the policy sandbox, promoted therein from at least one of the first development sandbox and a second development sandbox.

14. The system of claim 13, further comprising a server configured to provide the policy sandbox and to compute the initial application test results based on, at least in part, testing of the entire software application, and wherein the first processor is adapted to receive the application test results.

15. The system of claim 14, wherein the server is configured to designate the updated application test results as the initial application test results.

16. The system of claim 14, wherein the server is further configured to:
designate a scan ID to the initial application test results;
compute and associate with the scan ID, a compliance result based on, at least in part, the initial application test results; and
store the compliance result associated with the scan ID in the policy sandbox.

17. The system of claim 14, wherein the server is further configured to:
designate a scan ID to the initial application test results;
compute and associate with the scan ID, a compliance result based on, at least in part, the updated application test results; and
store the compliance result associated with the scan ID in the policy sandbox.

18. The system of claim 14, wherein a single processor comprises both the first processor and the server.

19. A system for facilitating distributed security and vulnerability testing of a software application, the system comprising:
a memory comprising at least a portion of application-level security policy parameters; and
a first processor coupled to the memory and configured to:
provide a first development sandbox adapted to: (i) receive a first portion of the entire application, and (ii) at least one of compute and receive application test results, the first development sandbox permitting further development of the first portion of the application received therein;
test the first portion of the application pursuant to at least a portion of the application-level security policy parameters, to obtain first development sandbox test results, wherein:
to test the first portion of the application, the first processor is configured to:
(a) obtain initial development sandbox test results by testing in a first iteration the first portion of the application;
(b) compute an initial difference between the initial development sandbox test results and the application test results;
(c) obtain an initial evaluation by evaluating policy flaw restrictions based on, at least in part, the initial difference;
(d) if the evaluation fails:
(A) obtain revised development sandbox test results by testing in a second iteration the first portion of the application;
(B) compute a revised difference between the revised development sandbox test results and at least one of the application test results, the initial development sandbox test results, and previously revised development sandbox test results; and
(C) obtain a revised evaluation by evaluating policy flaw restrictions based on, at least in part, the revised difference; and
to update the policy sandbox, the first processor is further configured to:
(e) designate as first development sandbox test results the initial development sandbox test results if the initial evaluation succeeds, or the revised development sandbox test results if the revised evaluation succeeds; and
(f) promote, to the policy sandbox, the first development sandbox test results.

20. An article of manufacture, comprising a non-transitory machine-readable medium storing instructions that, when executed by a machine comprising a memory and a processor in electronic communication with the memory, configure:
the memory to store at least a portion of application-level security policy parameters; and
the processor, wherein:
for facilitating distributed security and vulnerability testing of a software application, said processor is configured to:

provide a first development sandbox adapted to: (i) receive a first portion of the entire application, and (ii) at least one of compute and receive application test results, the first development sandbox permitting further development of the first portion of the application received therein;

test the first portion of the application pursuant to at least a portion of the application-level security policy parameters, to obtain first development sandbox test results; and update a policy sandbox with the first development sandbox test results; and for testing the first portion of the application, said processor is configured to:
  (a) obtain initial development sandbox test results by testing in a first iteration the first portion of the application;
  (b) compute an initial difference between the initial development sandbox test results and the application test results;
  (c) obtain an initial evaluation by evaluating policy flaw restrictions based on, at least in part, the initial difference;
  (d) if the evaluation fails:
    (A) obtain revised development sandbox test results by testing in a second iteration the first portion of the application;
    (B) compute a revised difference between the revised development sandbox test results and at least one of the application test results, the initial development sandbox test results, and previously revised development sandbox test results; and
    (C) obtain a revised evaluation by evaluating policy flaw restrictions based on, at least in part, the revised difference; and for updating the policy sandbox, said processor is configured to:
  (a) designate as first development sandbox test results the initial development sandbox test results if the initial evaluation succeeds, or the revised development sandbox test results if the revised evaluation succeeds; and
  (b) promote, to the policy sandbox, the first development sandbox test results.

* * * * *